Nov. 24, 1925.                                                              1,563,149
                              H. F. BENNER
                          AUXILIARY SPRING DEVICE
                           Filed Aug. 5, 1924
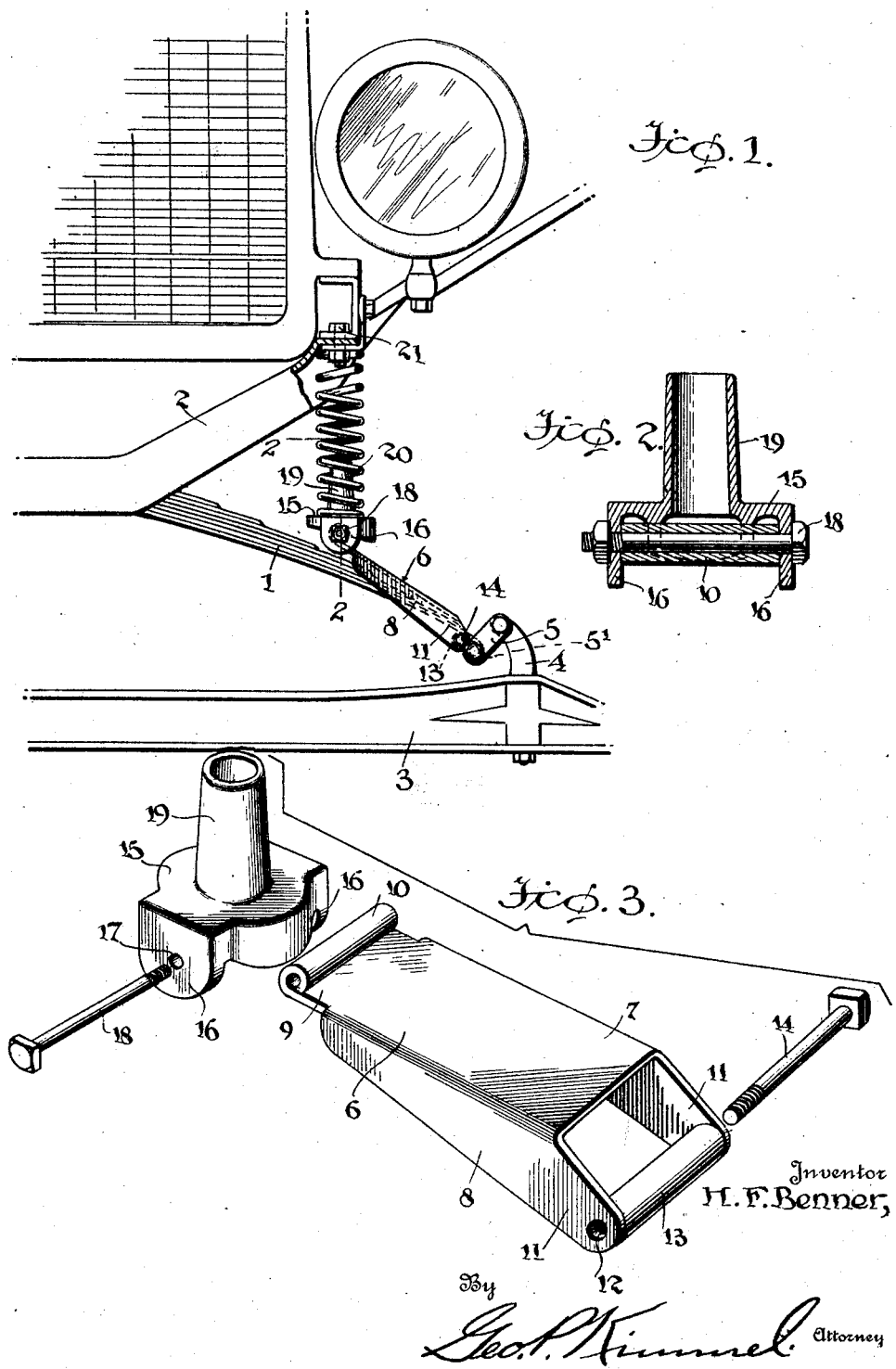

Patented Nov. 24, 1925.

1,563,149

UNITED STATES PATENT OFFICE.

HARVEY F. BENNER, OF TOLEDO, OHIO, ASSIGNOR TO THE BUCKEYE AUXILIARY SPRING COMPANY, OF TOLEDO, OHIO.

AUXILIARY SPRING DEVICE.

Application filed August 5, 1924. Serial No. 730,220.

*To all whom it may concern:*

Be it known that I, HARVEY F. BENNER, a citizen of the United States, residing at Toledo, in the county of Lucas and State of Ohio, have invented new and useful Improvements in Auxiliary Spring Devices, of which the following is a specification.

This invention relates to supplementary springs for vehicles, and is analogous to and an improvement upon the type disclosed in Patents Nos. 1,236,042 and 1,260,131, formerly issued to me.

The primary object of this invention is the provision of an auxiliary spring, in a manner as hereinafter set forth, which is not intended to act as a shock absorber, but is designed to overcome certain inherent weaknesses in the construction of certain types of sedans, delivery cars and trucks.

A further object of the invention is the provision, in a manner as hereinafter set forth, of an auxiliary spring adapted to be placed on the front or rear spring of a motor vehicle, and connect with the under surface of the frame, to prevent the same from bearing down or leaning sideways thus preventing the sheering off of the center bolt, relieving strain upon tires and chassis by preventing side sway when turning corners or travelling rough roads and preventing the fenders from rubbing the tires or coming in contact with the chains when the same are used upon the tires.

A further object of this invention is the provision, in a manner as hereinafter set forth, of an auxiliary spring of such construction that the application thereof to a machine may be made without the use of extra fittings, drilling of holes or making of any changes whatsoever.

A still further object of the invention is the provision, in a manner as hereinafter set forth, of an auxiliary spring of simple construction, neat appearance, light but strong and durable, and inexpensive to manufacture.

The invention will be best understood from a consideration of the following detailed description taken in connection with the accompanying drawing forming part of this specification, with the understanding that the invention is not confined to any strict conformity with the showing of the drawings, but may be changed and modified so long as such changes and modifications mark no material departure from the salient features of the invention as expressed in the appended claims.

In the drawings:—

Figure 1 is a front elevation of a portion of an automobile showing the structure embodying this invention as applied thereto.

Fig. 2 is a detail sectional view taken on the line 2—2 of Fig. 1, with the spring removed.

Fig. 3 is the group respective of the device embodying this invention, exclusive of the spring.

Referring now to the drawings in detail, wherein like numerals of reference indicate corresponding parts throughout the several figures of the drawing, a portion of the front of an automobile is shown as in Fig. 1, showing the usual spring structure 1, the cross bar 2 of the chassis frame, the front axle 3, the spring perch 4, and the connecting link 5 between the spring perch 4 and the looped end 5' of the spring.

The device embodying this invention, comprises a saddle member 6, formed of a top substantially elongated plate 7, having formed with each side a depending skirt 8. As will be plainly seen in Fig. 3, the top plate at its forward end extends beyond the ends of the skirt 8 as at 9, and has its end rolled back to form the bearing 10. At the other end of the plate 7, it will be seen, that the skirt members 8 extend beyond the end of the plate at a downward inclination, forming the spaced arms 11, each provided near its outer end with a passage 12.

This saddle member is adapted to be positioned upon the upper side of the spring member, and when in such position, the apertures 12 are a subtsantial distance beneath the lower edge of the spring, and are adapted to receive therebetween, and between the ends of the arms 11, an anti-friction device in the form of a roller member 13, secured in place by the bolt 14, which passes through the passages provided in the ends of the arms and through a corresponding bore through the longitudinal center of the roller 13. When these parts are assembled upon the spring the end of the spring is positioned between the end of the plate and the surface of the roller 13 upon which the under surface of the spring is adapted to move.

With the saddle in the position above described, a platform 15, is now placed at the upper end above the bearing 10. This platform is provided with depending ear members 16, each having therethrough a passage 17 to receive a bolt 18 which passes through the bearing 10 connecting the platform with the upper end of the plate 7. The platform 15 has arranged concentrically thereon, the vertical post 19 adapted to be inserted into one end of a helical spring 20 which end has its bearing upon the platform 15, and has its other end when in position, bearing against the under surface of the cross member 2 of the chassis frame, surrounding the head of the bolt 21, which connects that cross member with the side channel members of the chassis. From the foregoing description, it may be seen that the application of this device to any vehicle is very simple and easy, there is no connection between the loop 5' of the spring and the device, the end of the spring passing through the space between the end of the plate 7 and the roller 13, and adapted to roll upon the roller when the spring 1 is depressed and brought down against it, and further when upon rebound, the pressure upon the spring 20 is relieved, the saddle will then tend to ride up slightly upon the spring 1 and here again the roller 13 comes into play rolling along the under surface of the spring 1 and giving the saddle a free movement without danger of the same leaving its position upon the spring. It is to be understood of course that the space between the end of the plate 7 and the surface of the roller 13 is not large enough to allow very loose connection between the plate and the roller in the spring, but is of a size to receive the spring snugly therein thus giving free movement and eliminating any possibility of rattle or noise.

What I claim is:—

1. In combination with a vehicle spring, a saddle adapted to rest upon and engage over said spring, an anti-friction device carried by said saddle to play upon the under surface of said spring on activity of the latter, a resilient element, and a shiftable supporting means connected with said saddle for supporting said resilient element beneath and in contact with the under surface of a vehicle body.

2. In combination with a vehicle spring, a saddle adapted to rest upon and engage over said spring, an anti-friction device carried by said saddle to play upon the under surface of said spring on activity of the latter, a resilient element, and a shiftable supporting means connected with said saddle for supporting said resilient element beneath and in contact with the under surface of a vehicle body, said saddle having one end rolled to provide a bearing for connection with said supporting means.

3. In combination with a vehicle spring a saddle adapted to rest upon and engage over said spring, an anti-friction device carried by said saddle to play upon the under surface of said spring on activity of the latter, a resilient element, a shiftable supporting means connected with said saddle for supporting said resilient element beneath and in contact with the under surface of a vehicle body, said saddle having one end rolled to provide a bearing for connection with said supporting means, depending apertured ears carried by said supporting means and adapted to be positioned one on either end of said bearing, and a pivot bolt extending through said ear and said bearing.

4. In combination with a vehicle spring, a substantially elongated plate having depending side skirts, and adapted to be positioned over said spring, an anti-friction device carried by said skirts to engage the under surface of said spring upon activity of the latter, a resilient element, and a shiftable supporting means connected with said saddle for supporting said resilient element beneath and in contact with the under surface of a vehicle body.

5. In combination with a vehicle spring, a substantially elongated plate having depending side skirts, and adapted to be positioned over said spring, an anti-friction device carried by said skirts to engage the under surface of said spring upon activity of the latter, a shiftable supporting platform for supporting said spring beneath and in contact with the under surface of a vehicle body, a pivot pin carried by said platform at its under side, and a bearing formed at one end of said plate to receive said pin.

6. In combination with a vehicle spring, a substantially elongated plate having depending side skirts, and adapted to be positioned over said spring, said plate at one end extending beyond the ends of said skirts, and rolled to provide a bearing, said skirts extending beyond the other end of said plate at a downward inclination therefrom and provided with apertures through the ends thereof, an anti-friction roller for contact with the under surface of said spring, having a longitudinal bore adapted to align with said apertures, pivot means for securing said roller in place, a helical spring, a platform having means for supporting said spring thereon in a vertical position beneath and in contact with the vehicle body, and means for establishing a pivotal connection between said bearing and said platform.

In testimony whereof, I affix my signature hereto.

HARVEY F. BENNER.